June 27, 1972 J. C. LITTMANN Re. 27,407

WINDOW REGULATOR WITH FLEXIBLE SHAFT

Original Filed April 11, 1967

INVENTOR
JOSEPH C. LITTMANN

BY Whittemore, Hulbert & Belknap

ATTORNEYS

United States Patent Office

Re. 27,407
Reissued June 27, 1972

27,407

WINDOW REGULATOR WITH FLEXIBLE SHAFT

Joseph C. Littmann, Temperance, Mich., assignor to Ferro Manufacturing Corporation, Detroit, Mich.

Original No. 3,487,704, dated Jan. 6, 1970, Ser. No. 630,089, Apr. 11, 1967. Application for reissue Mar. 3, 1970, Ser. No. 16,270
Int. Cl. F16h *29/20*
U.S. Cl. 74—89.2 11 Claims

Matter enclosed in heavy brackets [ ] appears in the original patent but forms no part of this reissue specification; matter printed in italics indicates the additions made by reissue.

ABSTRACT OF THE DISCLOSURE

A window regulator for automobiles comprising a motor, a drive shaft composed of a plurality of aligned sections, a resilient torsion member interconnecting the sections at opposite ends of the shaft, and gearing at the output end of the shaft for connection to a window regulator.

CROSS-REFERENCE TO RELATED APPLICATION

This application is related to application Ser. No. 630,013, filed Apr. 11, 1967, directed to the motor and transmission housing associated with the present construction.

BACKGROUND OF THE INVENTION

In the past it has been recognized that when a direct drive is provided between the electric motor and the window, when the closing movement of the window is arrested, the full torque of the electric motor and the torque attributable to the flywheel of the armature are combined to produce excessive closing force. Moreover, where the transmission is to a worm driving a toothed sector the irreversibility of the worm traps the torque which produces excessive frictional loading which must be overcome on reversal of the motor. Accordingly, it has been the practice to provide resilient means in the transmission, and in the present invention a simplified and improved resilient transmission component is provided.

SUMMARY OF THE INVENTION

In accordance with the present invention the electric motor coupled by suitable transmission means to the window regulator includes a yieldable torsion coupling effective when movement of the window to closed position occurs, to yield to permit limited additional rotation of the motor. When the motor is de-energized the yieldable transmission allows reverse rotation of the armature, thus reducing the frictional locking effect and permitting initial opening movement of the window to occur under more reduced load conditions than would otherwise be necessary.

It is an object of the present invention to provide, in a transmission of the character described, a motor having a hollow shaft formed of at least two aligned sections, one of which is rigidly connected to the rotatable armature of the motor, the other section being connected to the first section by an elongated torsion member extending through the compound shaft.

More specifically, it is an object of the present invention to provide a vehicle window regulator comprising an electric motor provided with the compound shaft described in the preceding paragraph in which a worm is connected to the output section of the shaft, a worm gear is provided in mesh with the worm, and an output pinion is rigidly connected to the worm gear adapted for meshing engagement with a toothed sector of a window regulator.

Other objects and features of the invention will become apparent as the description proceeds, especially when taken in conjunction with the accompanying drawing, illustrating a preferred embodiment of the invention.

DESCRIPTION OF THE PREFERRED EMBODIMENT

Figure 1:
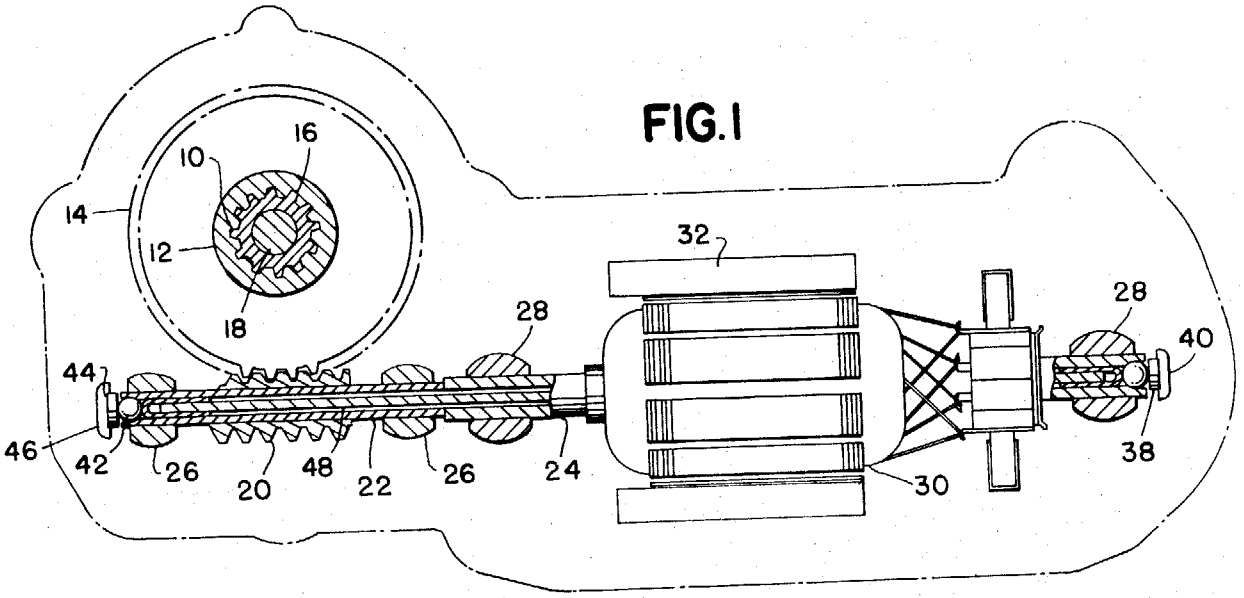
FIGURE 1 is a elevational view of the operating parts of the window regulator.

Referring now to the drawing, the window regulator comprises an output pinion, not shown in detail but including a hub portion 10, the pinion being adapted to run in mesh with a toothed sector of a conventional window regulator for motor vehicles. The pinion, whose hub 10 is splined to a sleeve portion 12 of the worm gear 14 as indicated at 16, is rotatable with the worm gear 14 on a pivot mounting or pin 18.

Rotation is imparted to the worm gear 14 from a worm 20 fixed or otherwise rigidly secured to an output end section 22 of a compound shaft which includes a separate input end section 24. The output shaft section 22 is mounted for rotation independently of the input shaft section 24 in bearings 26. Similarly, the input shaft section 24 is mounted for rotation independently of the output shaft section 22 in bearings 28.

Figure 2:
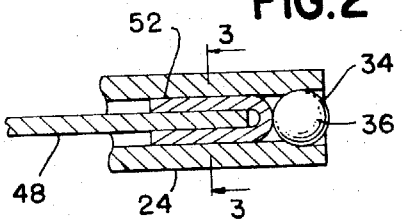
FIGURE 2 is an enlarged section at one end of the compound shaft.

The input shaft section 24 extends through and is fixed to a rotatable armature 30 of an electric motor including field members 32. At its right hand end, as seen in the figure, the input shaft section 24 is recessed as indicated at 34 in FIGURE 2, and receives a ball 36 which constitutes a thrust bearing. The ball 36 engages a thrust plate 38 which is positioned by a fixed abutment 40. A similar construction is provided at the left hand end of the output shaft section 22, the thrust ball bearing being indicated at 42 in engagement with a thrust plate 44 retained in position by an abutment 46.

Torque is transmitted from the input shaft section 24 to the output shaft section 22 by an elongated torsion element 48 which as illustrated, is in the form of a flat spring.

Figure 3:
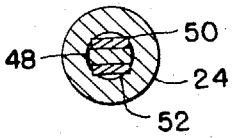
FIGURE 3 is a fragmentary section on the line 3—3, FIGURE 2.

In order to transmit torque from the input shaft section 24 to the output shaft section 22 through the elongated torsion member 48, the end portions of both shaft sections are shaped to provide square corners as indicated at 50 in FIGURE 3, and a U-shaped strip 52 is provided over the end of the shaft as clearly illustrated in FIGURE 3. From this figure it will be observed that rotation imparted to the shaft section 24 by the armature transmits rotation through the engagement with the U-shaped strip 52 to the end of the flat torsion member 48. Identical constructions are provided at both ends.

In practice, the torsion member may have a cross-sectional width of ⅛ inch and a thickness of 1/32 inch. Total maximum deflection of the wire torsion coupling is about 360 degrees and the torque which it is designed to transmit at this maximum deflection may be on the order of 120-ounce inches.

When the window regulator operation is initiated by energizing the motor, the armature 30 commences its rotation and winds up the torsion member 48, thus providing a smooth initial start of movement of the window in either direction and also providing most efficient use of the available power thereby permitting satisfactory operation with a motor having less capacity than would be quired if a rigid coupling were provided between the otor and worm.

The drawing and the foregoing specification constitute description of the improved window regulator with flexi- e shaft in such full, clear, concise and exact terms as to ıable any person skilled in the art to practice the inven- ɔn, the scope of which is indicated by the appended aims.

What I claim as my invention is:

1. A vehicle window regulator comprising a rotary otor, aligned fully independently rotatable hollow input ıd output shaft sections, means connecting the input ction to said motor, an elongated torsion member ex- nding through said shaft sections and having its ends ted therein adjacent the remote ends thereof, said tor- ɔn member being a wire of rectangular cross-section, e remote ends of said shaft sections including cornered ıambers, U-shaped clips engaged over the ends of said ire, firmly engaging opposite sides thereof, and having ɔrners seated in said cornered chambers, a worm on said ıtput shaft section, a worm gear in mesh with said worm ıd a regulator pinion fixed to said worm gear.

2. A vehicle window regulator comprising a rotary mo- ır, aligned fully independently rotatable hollow input ıd output shaft sections, means connecting the input sec- ɔn to said motor, an elongated torsion member in the ɔrm of a wire of rectangular cross-section extending ırough said shaft sections and having its ends fixed there- . adjacent the remote ends thereof a pair of ball thrust :arings received in the remote open end of said shaft ctions, and thrust plates engaging said ball thrust bear- gs beyond the remote ends of said shaft sections, the ɔenings in the remote open ends of said shaft sections :ing enlarged to provide seats for said ball thrust bear- gs, a worm on said output shaft section, a worm gear in esh with said worm and a regulator pinion fixed to said orm gear.

3. A power unit comprising a rotary electric motor, ıafting comprising aligned hollow fully independently ɔtatable input and output shaft sections having their ends proximity to provide a tubular enclosure, means rigidly ɔnnecting the motor to the input shaft section, and an ongated resiliently yieldable torsion member extending ırough said enclosure and having its ends rigidly con- ected to substantially separated portions of said shaft ctions, said torsion member being in the form of a wire f rectangular cross-section, the remote ends of said ıafts including cornered chambers, and U-shaped clips ıgaged over the ends of said wire, firmly engaging op- ɔsite sides thereof, and having corners seated in said ɔrnered chambers.

4. A power unit comprising a rotary electric motor, ıafting comprising aligned hollow fully independently ɔtatable input and output shaft sections having their ends proximity to provide a tubular enclosure, means rigidly ɔnnecting the motor to the input shaft section, an elon- ıted resiliently yieldable torsion member extending ırough said enclosure and having its ends rigidly con- ected to substantially separated portions of said shaft ctions, a pair of bearings supporting each of said shaft ctions, ball thrust bearings received in the remote open ıds of said shaft sections, and thrust plates engaging said ıll thrust bearings beyond the remote ends of said shaft ctions, the openings in the remote open ends of said ıaft sections being enlarged to provide seats for said ball ırust bearings.

*5. In an electrically operated window regulator for utomobiles comprising window lifting mechanism in- luding a pinion, drive means coupled to said pinion com- rising an elongated drive shaft which is flexible in tor- on and which has a drive connection at one end of uni- ɔrm non-circular cross-section, an electric motor having rotatable armature, a tubular drive shaft on which said rmature is mounted, said shaft being open at both ends nd extending completely through said armature, one end of said tubular shaft having therein an elongated recess of uniform non-circular cross-section corresponding to the uniform non-circular cross-section of the drive connection at one end of said flexible drive shaft adapted to receive the drive connection at one end of the flexible drive shaft in longitudinally slidable torque transmitting relation while the other end of the flexible drive extends through and beyond the other end of said tubular shaft for connection to the pinion of the window regulating mechanism, and thrust bearing means comprising a fixed abutment adjacent the open end of said tubular shaft provided with the non-circular recess and means interposed between said abutment and the adjacent end of said flexible shaft.*

*6. Structure as defined in claim 5 in which said thrust bearing means includes a ball received in the said one end of said tubular shaft engageable with the drive connection on the drive shaft, and a fixed ball engaging element mounted in closely spaced relation to the said one end of said shaft and engageable with said ball.*

*7. Structure as defined in claim 6 in which said element is a plate positioned beyond the said one end of said tubular shaft and in which said ball projects beyond the said one end of said tubular shaft for engagement therewith.*

*8. Structure as defined in claim 5 in which the drive means coupled to said pinion includes a worm and worm gear, the worm being adapted to be connected to the flexible drive shaft and to impart substantial axial thrust thereto upon operation of the window lifting mechanism.*

*9. Structure as defined in claim 5 in which the drive connection at one end of the flexible shaft has an end formation providing multiple corners, and in which the said one end of said tubular shaft has longitudinally extending recesses in which the corners are slidably received in torque transmitting relation.*

*10. Structure as defined in claim 9 in which the end formation of the flexible shaft is substantially square in cross-section.*

*11. Structure as defined in claim 9 in which the said one end of said tubular shaft has a ball receiving seat extending to the end thereof, and said bearing means comprises a ball in said seat extending beyond the said one end of said tubular shaft and a fixed ball engaging element mounted in closely spaced relation beyond the said one end of said tubular shaft.*

References Cited

The following references, cited by the Examiner, are of record in the patented file of this patent or the original patent.

UNITED STATES PATENTS

| | | | |
|---|---|---|---|
| 1,469,424 | 10/1923 | McQuaid et al. | 308—233 |
| 1,517,285 | 12/1924 | Fischedick et al. | 74—411 XR |
| 1,780,248 | 11/1930 | Spreen | 308—233 X |
| 2,317,490 | 4/1943 | Simpson | 74—411 UX |
| 2,403,075 | 7/1946 | Green | 74—89.2 |
| 2,688,883 | 9/1954 | Schut | 74—411 X |
| 2,698,526 | 1/1955 | Beier | 64—27 X |
| 2,738,660 | 3/1956 | Gail. | |
| 3,016,723 | 1/1962 | Gondek | 64—27 |
| 3,208,298 | 9/1965 | Pickles | 74—411 |
| 3,321,988 | 5/1967 | Peras | 64—27 X |
| 3,369,425 | 2/1968 | Runkle et al. | 287—104 X |
| 2,973,214 | 2/1961 | Bates et al. | 287—126 |

FOREIGN PATENTS

| | | |
|---|---|---|
| 263,229 | 12/1926 | Great Britain. |

MANUEL A. ANTONAKAS, Primary Examiner

U.S. Cl. X.R.

64—27; 287—103, 126